United States Patent [19]
Kim

[11] Patent Number: 5,826,694
[45] Date of Patent: Oct. 27, 1998

[54] SYSTEM FOR TAKING CLUTCH HUB AND SLEEVE INTO/OUT OF A CLEARANCE MEASURING SYSTEM

[75] Inventor: Hong-Song Kim, Kunp'O, Rep. of Korea

[73] Assignee: KIA Motors Corporation, Seoul, Rep. of Korea

[21] Appl. No.: 725,686

[22] Filed: Oct. 2, 1996

[30] Foreign Application Priority Data

Aug. 28, 1996 [KR] Rep. of Korea ..................... 96-36200

[51] Int. Cl.⁶ ................................................. B65G 47/00
[52] U.S. Cl. ................................... 198/346.2; 198/341.03
[58] Field of Search ..................... 198/341.01, 341.03, 198/341.08, 346.1, 346.2

[56] References Cited

U.S. PATENT DOCUMENTS

| | | | |
|---|---|---|---|
| 3,854,707 | 12/1974 | Armstrong et al. | 198/346.2 X |
| 4,465,416 | 8/1984 | Burhsalter et al. | 198/346.2 X |
| 4,583,634 | 4/1986 | Kraus et al. | 198/341.01 |
| 5,109,973 | 5/1992 | Hirano et al. | 198/341.03 |

*Primary Examiner*—James R. Bidwell

[57] ABSTRACT

A system for taking a clutch-hub and sleeve into or out of a clearance measuring system, including a taking-in chain conveyer having at least one stopper which stops an operation of a taking-in motor while contacting the clutch hub and the sleeve, the taking-in chain conveyer being disposed along a side of the clearance measuring system; a main chain conveyer having first and second main stoppers, the main chain conveyer being connected to a final end of the taking-in chain conveyer and disposed along a front side of the clearance measuring system; a clamping mechanism for clamping the clutch hub and the sleeve, stopped by the second main stopper, and which takes the clutch hub and the sleeve into/out of the clearance measuring system; a taking-out chain conveyer having a taking-out stopper pusher which, when the clutch hub and the sleeve go thorough a measuring process, transmits the clutch hub and the sleeve to the taking-out chain conveyer, the taking-out chain conveyer being connected orthogonally to a final end of the main chain conveyer; and a main controller for controlling the operation of the elements successively.

1 Claim, 3 Drawing Sheets

SYSTEM FOR TAKING CLUTCH HUB AND SLEEVE INTO/OUT OF A CLEARANCE MEASURING SYSTEM

FIELD OF THE INVENTION

The present invention relates to a system for taking a clutch hub which is connected to an input shaft of a transmission for a vehicle, and a sleeve which is connected to the clutch hub, into/out of a measuring system for measuring a clearance between the hub and the sleeve.

BACKGROUND OF THE INVENTION

A transmission for a vehicle typically includes: an input shaft on which a clutch, for selectively transmitting rotating force of an engine, is mounted; an output shaft connected to wheels for transmitting rotating force from the input shaft to the wheels; and a gear unit having a plurality of gears, carried on the input and output shafts, for varying rotational direction and amount of rotating force and for transmitting the varied rotating force to the output shaft.

The gear assembly includes: a clutch hub splined to the input shaft; a sleeve splined to an outer circumference of the hub and able to slide along an axis of the input shaft; and a pair of gears, respectively carried on the input and output shafts, that are disengaged or engaged with each other. In other words, the clutch hub and the input shaft rotate according to the rotating force of the engine, and thus, the sleeve splined to the outer circumference of the clutch hub is also rotated. In this state, the sleeve is selectively engaged with the gear carried on the output shaft while moving along the outer circumference of the clutch hub. The selective engagement of the sleeve and gears act in response to the operation of the shift selector lever, thereby transmitting a rotating force of the clutch hub to the output shaft.

In order to assure the effective transmission of the rotating force of the clutch hub to the gear carried on the output shaft when the sleeve slides along the outer circumference of the clutch hub, a predetermined clearance should be maintained between the clutch hub and the sleeves.

Therefore, before assembling the sleeve and the clutch hub, the clearance between the sleeve and the clutch hub should be measured to identify if it matches up to a design specification. A conventional measuring method will be described hereinafter.

First, after fixing the clutch hub to a jig, the sleeve is combined with the clutch hub. At this point, when assuming that the clutch hub has the same outer circumferential width as the sleeve, a worker disposes the clutch hub and the sleeve such that the circumferential center lines of the clutch hub and the sleeve can be disposed on the same plane.

In this state, the worker inserts a linear variable differential transformer, which has a clearance measuring gauge such as a dial gauge, into an axial hole of the clutch hub.

The linear variable differential transformer is a detector which converts a mechanical displacement value into an electric value. Although normal transformers are used for the purpose of voltage ascent and descent and impedance conversion, these are substantially mechanic-to-electric conversion systems which convert the mechanical displacement into a current in response to voltage. That is, the linear variable differential transformer is a sensor for precisely detecting the mechanical displacement.

Next, the worker moves the differential transformer up-and-down at a distance of 100 mm from the center of the clutch hub and the sleeve and reads a value appearing on the dial gauge of the differential transformer, indicating the clearance. Clearance in a horizontal direction is also measured in the same manner.

In the above-described measuring method, since the worker's measuring location is 100 mm away from the center of the clutch hub and the sleeve, there is great possibility that the measured clearance value is different from an actual clearance value. In addition, since it is impossible to apply a constant force to the differential transformer whenever measuring a clearance, the reliability of the system deteriorates.

In addition, since the disposition of the outer circumferential center lines of the clutch hub and the sleeve on the same plane is performed by a visual measurement of the worker, it is also impossible to precisely measure the clearance.

Therefore, a measuring error caused by the foregoing reasons causes a malfunctioning in the shift operation.

To solve the above-described problems, a clearance measuring system has been proposed as shown in FIGS. 1 and 2.

The clearance measuring system 10 is designed to measure a clearance by gauging an advance distance of a sleeve 2 with respect to a clutch hub 1 in an axis direction rather than by directly gauging the clearance between the clutch hub and the sleeve. The advance distance is a distance from a circumferential center line of the clutch hub to a circumferential center line of the sleeve, caused by the clearance when the sleeve is engaged with the clutch hub.

That is, the clearance measuring system includes a frame 10, a lower fixing member 11, mounted on the frame for supporting the clutch hub 1, and two ball points 12, mounted on a Y axis which passes through a center of the clutch hub 1 for elastically supporting the sleeve 2. Namely, the clutch hub 1 is supported by the lower fixing member 11 and the sleeve is supported by the ball points 12.

Therefore, when pre-setting the height of the lower fixing member 11 and the ball point 12, the circumference center lines of the clutch hub and the sleeve, inherently and precisely come to be disposed on the same plane.

In addition, the upper fixing member 13 is connected to a piston mounted on a first pressing cylinder 14a, moving up-and-down in response to a reciprocating movement of the first pressing cylinder 14a. The upper fixing member 13 includes a fixing portion 13a connected to the piston, a pressing portion 13c, rotatably supported by a bearing 13b on a shaft hole formed on a lower central portion of the fixing portion for pressing the clutch hub 1, and a bolt 13d for fixing the pressing member 13c on the fixing portion 13a.

A rotating die 15 for rotating both the clutch hub 1 and the sleeve 2 is mounted in the frame 10 and is rotatably supported by a bearing 15a so as to rotate the lower fixing member 11. Accordingly, a rotating force of the rotating die 15 is transmitted to the lower fixing member 11 supporting the clutch hub 1 so that the clutch hub 1 and the pressing portion 13c can rotate.

Measuring means for measuring the advance distance of the sleeve 2 is located on an X axis direction which is defined by being rotated from a Y axis connecting the two ball points 12 on the sleeve 2 by 90 degrees. The measuring means includes: right and left differential transformers 16 and 16', on lower ends of which right and left pressing members 16a and 16a' for pressing the sleeve 2 are respectively attached; second right and left pressing cylinders 14b and 14b', connected respectively to upper ends of the differential transformers 16 for moving up-and-down the differential transformers; right and left measuring sensors 17 and 17', attached respectively on upper ends of the differential transformers 16 and 16', for sensing a moving distance of the differential transformers 16; and an indicator (not shown) for representing the moving distance of the differential transformers, sensed by the measuring sensor 17, in a digital manner. Here, the advance distance of the sleeve is ½ of a moving distance difference of the pair of differential transformer 16 which moves by the second pressing cylinder 14b.

A method for measuring a clearance between the clutch hub 1 and the sleeve 2 by use of the above-described clearance measuring system will be described hereinafter with reference to FIGS. 3 and 4.

First, to measure an advance distance of the sleeve 2 in the X axis, the clutch hub 1 and the sleeve 2 are taken into the clearance measuring system and then disposed on the lower fixing portion 11.

When the first pressing cylinder 14a operates descending the upper fixing member 13, the clutch hub 1 is fixed at a desired position by the pressing portion 13c.

The sleeve is then splined to the outer circumference of the clutch hub 1 such that the lower portion of the sleeve 2 is supported by the two ball points 12. By the rotation of the rotating die 15, the sleeve 2 is rotatable from the Y axis which connects the two ball points 12 to each other on the X axis by 90 degrees. Since the heights of both the lower fixing member 11 and the ball points 12 are pre-set such that the circumferential center lines C and C' of the clutch hub 1 and sleeve 2 come to be located on the same plane, the circumferential center lines of the sleeve 2 and the clutch hub 1 can be located on the same plane without any special adjusting operation.

After this, the left pressing cylinder 14b' is operated such that the left differential transformer 16' can be ascended to a predetermined distance. The ascended transformer 16' depresses the sleeve 2 such that the sleeve 2 rotates in a counterclockwise direction on the basis of the circumferential center line C' thereof to an amount corresponding to the amount of clearance between the two members. That is, the left portion of the sleeve 2 descends and the right ascends. At this point, the descended position of the sleeve 2 becomes a reference point of the measuring sensor 17. After this, the right pressing cylinder 14b operates to descend the differential transformer 16 such that the sleeve is depressed. By this operation, the sleeve 2 rotates in a clockwise direction on the basis of the circumferential center line thereof such that the left side of the sleeve ascends. At this state, the measuring sensor 17 detects the advance distance of the ascended sleeve 2 from the reference point. The detected advance distance of the sleeve is represented on the indicator in the digital manner.

After measuring the advance distance of the sleeve in the Y axis direction, the clearance value L is calculated according to following equation:

$$L=[(l1+l2)/D]*100$$

where, l1 is an advance distance of the left side of the sleeve with respect to the clutch hub, l2 is an advance distance of the right side of the sleeve with respect to the clutch hub, and D is a distance between the left and right pressing members 16a' and 16a.

A user compares the measured clearance value L with a reference value through a table and determines if the measured clearance value L is equal to a test reference.

After this, to measure an advance value in the direction of X axis, the rotating die 15 operates to rotate the hub 1 and the sleeve 2 by 90 degrees. Finally, the measured advance value L in the X axis direction is also compared with a reference table and it is determined if it is equal to a test reference. After finalizing the measurement, the sleeve and the clutch hub is taken out of the measuring system.

The above-described clearance measuring system has an advantage in that the reliability of the measured value can be improved.

However, the user must manually take the clutch hub and the sleeve into/out of the system, this operation being troublesome and inconvenient to the user.

SUMMARY OF THE INVENTION

In view of the foregoing, it is an object of the present invention to provide a system for taking a clutch hub and a sleeve into/out of a measuring system for measuring a clearance between the hub and the sleeve.

According to the present invention, the system comprises a taking-in chain conveyer having at least one stopper which stops an operation of a taking-in motor while contacting the clutch hub and the sleeve, the taking-in chain conveyer being disposed along a side of the clearance measuring system; a main chain conveyer having first and second main stoppers, the main chain conveyer being connected to a final end of the taking-in chain conveyer and disposed along a front side of the clearance measuring system; a clamping mechanism for clamping the clutch hub and the sleeve, stopped by the second main stopper, and which takes the clutch hub and the sleeve into/out of the clearance measuring system; a taking-out chain conveyer having a taking-out stopper pusher which, when the clutch hub and the sleeve go thorough a measuring process, transmits the clutch hub and the sleeve to the taking-out chain conveyer, the taking-out chain conveyer being connected orthogonally to a final end of the main chain conveyer; and a main controller for controlling the operation of the said elements successively.

When a set of current clutch hubs and the sleeves moving along the taking-in chain conveyer contacts the taking-in stopper, the taking-in motor stops and thus the taking-in chain conveyer also stops. Therefore, the set of current clutch hubs and sleeves stand by in their present positions. Then, when a space where the set of current clutch hubs and sleeves can be seated is provided on the main chain conveyer, the taking-in motor is driven so that the set of current clutch hubs and sleeves can be transmitted to the main chain conveyer. While moving along the main chain conveyer, the set of current clutch hubs and sleeves comes to contact the first main stopper, and another set of previously transmitted clutch hubs and sleeves comes to contact the second main stopper. Namely, the distance between the set of current clutch hubs and sleeves and the set of previously transmitted clutch hubs and sleeves is the same as that between the first and second main stoppers.

When completing the clearance measurement of the set of previously transmitted set of clutch hubs and sleeves, the set of current clutch hubs and sleeves is transmitted to the second main stopper and stops thereon. In this state, the clamping mechanism firmly clamps the set of current clutch hubs and sleeves and is taken into the clearance measuring system while the clamping mechanism rotates horizontally by degrees by the operation of the rotating air cylinder.

When completing the clearance measurement of the set of current clutch hubs and sleeves, the clamping mechanism again clamps and rotates in an opposite direction by 180 degrees so that the current clutch hubs and sleeves can be seated on the second main stopper. In this state, when the main motor is driven and, thus, the main chain conveyer rotates, the set of current clutch hubs and sleeves is transmitted to the final end of the main chain conveyer.

The set of current clutch hubs and sleeves transmitted to the final end of the main chain conveyer comes to contact the taking-out stopper, stopping the main motor, and is then transmitted to the taking out conveyer which is operated by the taking-out motor, and finally taken out by the pusher.

As described above, since the clutch hub and the sleeve is taken in/out of the clearance measuring system by a full automatic process, the measuring operation is easy and precise.

BRIEF DESCRIPTION OF THE DRAWINGS

A more complete appreciation of this invention, and many of the attendant advantages thereof, will be readily apparent with reference to the following detailed description when considered in conjunction with the accompanying drawings in which like reference symbols indicate the same or similar components, wherein.

DETAILED DESCRIPTION OF THE PREFERRED EMBODIMENT

Figure 2:
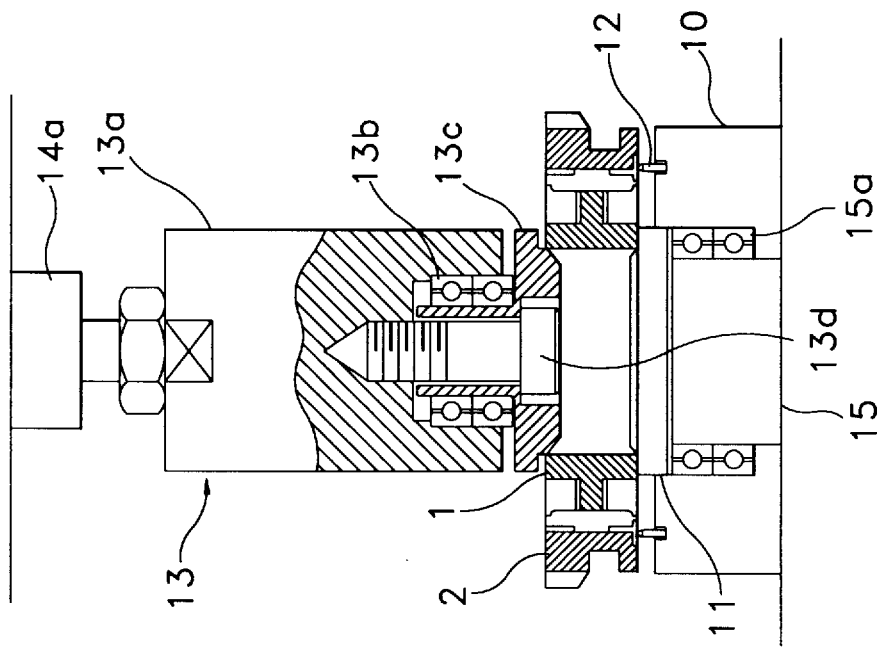
FIGS. 1 and 2 are schematic views illustrating a conventional clearance measuring system between a clutch hub and a sleeve.
Figure 1:
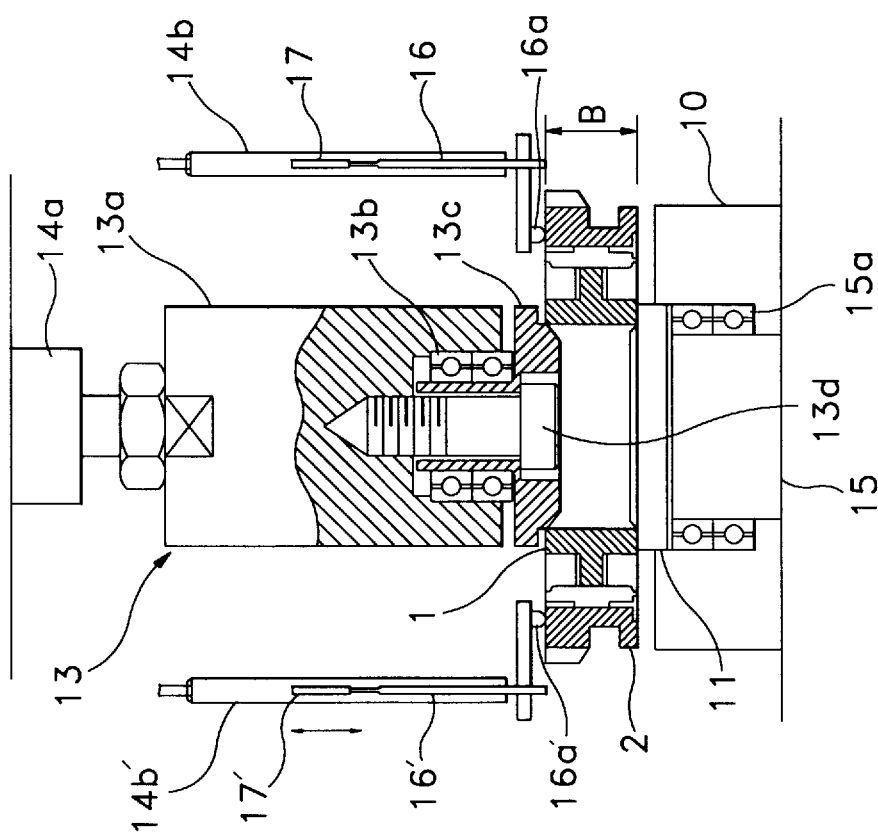
Figure 3:
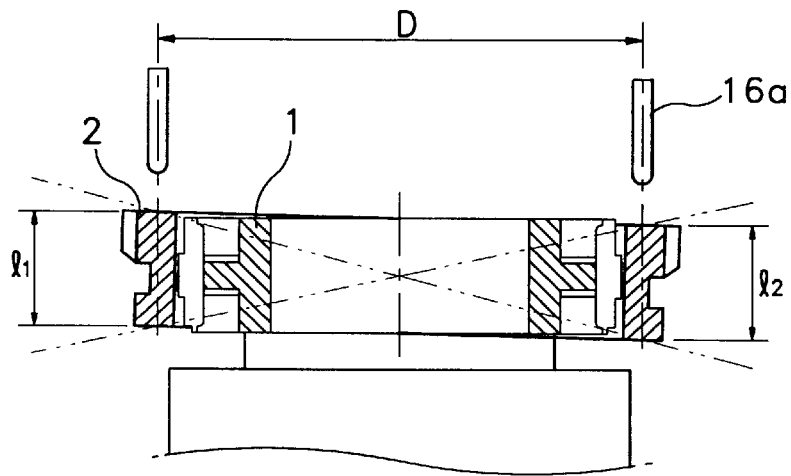
FIGS. 3 and 4 are views illustrating an operation of the system depicted in FIGS. 1 and 2.
Figure 4:
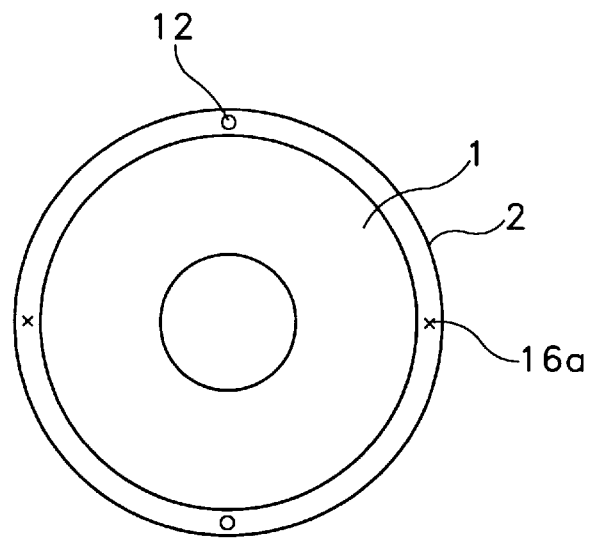

Reference will now be made in detail to the present preferred embodiment of the invention, an example of which is illustrated in the accompanying drawings. Wherever possible, the same reference numbers as the described prior art will be used in the drawing to refer to the same or like parts and the description thereof will be omitted.

Certain terminology will be used in the following description for convenience and reference only and will not be considered limiting. The words "right", "left", "upper", and "lower" will designate directions in the drawings to which reference is made.

Figure 5:
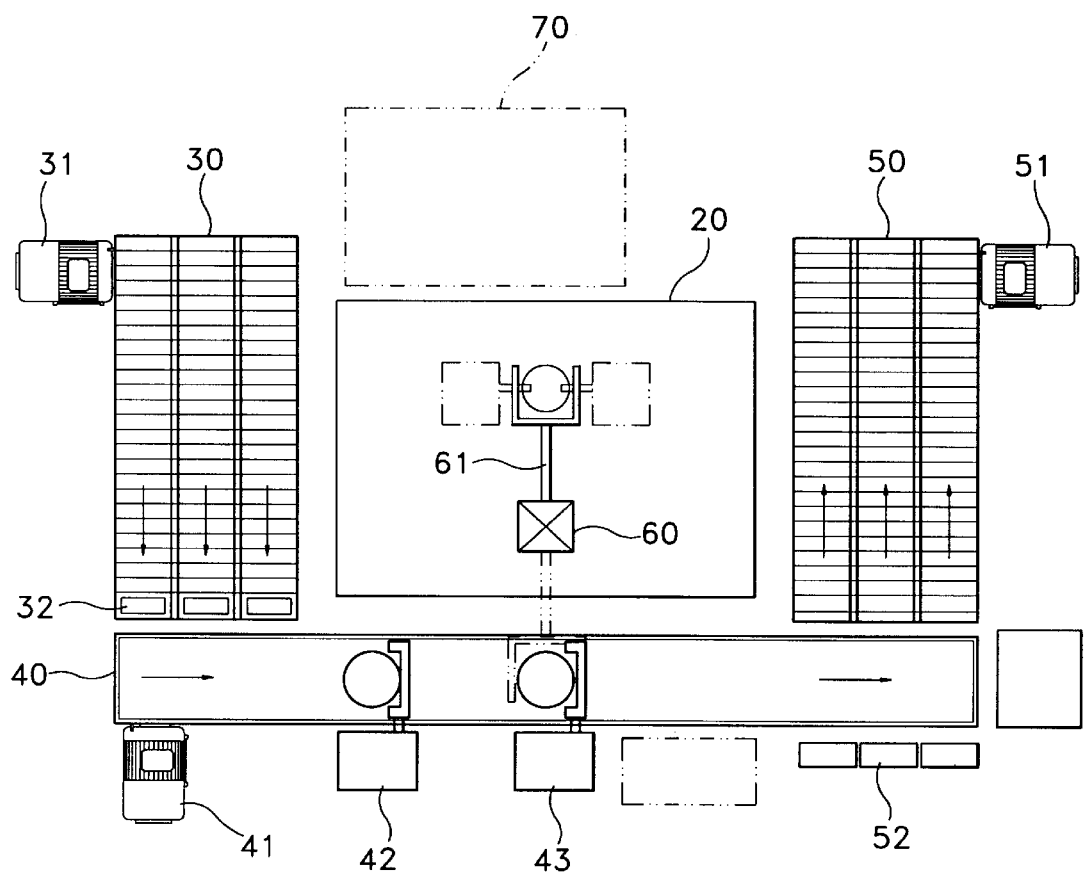
FIG. 5 is a schematic view illustrating a system for taking a clutch hub and a sleeve into/out of a measuring system for measuring a clearance between the hub and the sleeve in accordance with a preferred embodiment of the present invention.

Referring to FIG. 5, there is shown a schematic view of a system for taking a clutch hub and a sleeve into/out of a measuring system for measuring a clearance between the hub and the sleeve in accordance with a preferred embodiment of the present invention. The system includes a series of taking-in conveyers 30 for taking in three clutch hubs and three sleeves simultaneously. The taking-in conveyers 30 run along the left side of the clearance measuring system 20 and rotate in arrow direction. A motor 31 is mounted on the left-upper side of the series of taking-in conveyers 30. Three stoppers 32 are respectively attached on lower ends of the taking-in conveyers 30 to stop the drive of the motor 31 while contacting the clutch hubs and the sleeves.

In this embodiment, although three conveyers are used and, thus, three stoppers are used, the number of the conveyers and the stoppers is not limited to three.

A main chain conveyer 40 is connected to the lower ends of the taking-in conveyer and runs in an orthogonal direction to the taking-in conveyers 30. A main motor 41 which is a drive source of the main chain conveyer 40 is mounted on the left-lower side of the main chain conveyer 40. First and second main stoppers 42 and 43 are attached on the main chain conveyer 40 to stop the drive of the main motor 41 while contacting the clutch hubs and the sleeves.

Here, the second main stopper 43 is attached on a position of the main chain conveyer where the sleeves and the clutch hubs are taken in the clearance measuring system 20, and the first main stopper 42 is attached at a front of the second main stopper 43 where the clutch hubs and the sleeves are positioned to be taken into the measuring system to be measured.

The clutch hubs and the sleeves which are stopped by the second main stopper 43 are clamped by a rotating air cylinder 60 and are then taken into the clearance measuring system 20. After this, the clutch hubs and the sleeves, which went through a measuring process at the measuring system, are again clamped by the rotating air cylinder and taken out to the second main stopper 43. The rotating air cylinder 60 is mounted on the clearance measuring system 20. The rotating air cylinder 60 includes a clamp mechanism 61 for clamping the clutch hub and the sleeve. While the clamping mechanism horizontally rotates about the rotating air cylinder 60 by 180 degrees, the clutch hub and the sleeve are taken into/out of the measuring system 20.

A series of taking-out chain conveyers 50 to which the clutch hubs and sleeves, are taken out, is disposed orthogonal to the end of the main chain conveyer 40 and runs along the measuring system. A taking-out motor 51, which is a drive source for the taking-out chain conveyer, is mounted on the right-upper side of the taking-out chain conveyer 50.

Here, when the clutch hubs and the sleeves which move along the main chain conveyer 40, arrive in a position adjacent to the taking-out chain conveyer 50, the rotation of the main chain conveyer 40 should be stopped and the clutch hubs and the sleeves should be pushed by a predetermined force to the taking-out chain conveyer 50.

Therefore, there is provided stopper pushers 52 for stopping the drive of the main motor 41 and pushing the clutch hubs and the sleeves to the taking-out chain conveyer 50. The stopper pushers 52 are mounted on the right-lower end of the main chain conveyer 40.

The operation of each above-described element is precisely controlled by a main controller 70.

The operation of the above-described system will be described hereinafter in detail.

When a set of current clutch hubs and the sleeves moving along the taking-in chain conveyer 30 contacts the taking-in stopper 32, the taking-in motor 31 stops and thus the taking-in chain conveyer also stops. Therefore, the set of current clutch hubs and sleeves stand by in their present positions. Next, when a space where the set of current clutch hubs and sleeves can be seated is provided on the main chain conveyer 40, the taking-in motor is driven so that the set of current clutch hubs and sleeves can be transmitted to the main chain conveyer 40. While moving along the main chain conveyer 40, the set of current clutch hubs and sleeves comes to contact the first main stopper 42, and another set of previously transmitted clutch hubs and sleeves comes to contact the second main stopper 43. Namely, the distance between the set of current clutch hubs and sleeves and the set of previously transmitted clutch hubs and sleeves is the same as that between the first and second main stoppers 42 and 43.

When completing the clearance measurement of the set of previously transmitted set of clutch hubs and sleeves, the set of current clutch hubs and sleeves is transmitted to the second main stopper 43 and stops thereon. In this state, the clamping mechanism 61 firmly clamps the set of current clutch hubs and sleeves and is taken into the clearance measuring system 20 while the clamping mechanism 61 rotates horizontally by 180 degrees by the operation of the rotating air cylinder 60.

When completing the clearance measurement of the set of current clutch hubs and sleeves, the clamping mechanism 61 again clamps and rotates in an opposite direction by 180 degrees so that the current clutch hubs and sleeves can be seated on the second main stopper 43. In this state, when the main motor 41 is driven and, thus, the main chain conveyer 40 rotates, the set of current clutch hubs and sleeves is transmitted to the final end of the main chain conveyer 40.

The set of current clutch hubs and sleeves transmitted to the final end of the main chain conveyer 40 comes to contact the taking-out stopper 52, stopping the main motor, and is then transmitted to the taking out conveyer 50 which is operated by the taking-out motor 51, and finally taken out by the pusher 51.

As described above, since the clutch hub and the sleeve is taken in/out of the clearance measuring system by a full automatic process, the measuring operation is easy and precise.

While the invention has been described in connection with what is presently considered to be most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. A system for taking a clutch hub and a sleeve into/out of a measuring system for measuring a clearance between the hub and the sleeve, the system comprising:

a taking-in chain conveyer having at least one stopper which stops an operation of a taking-in motor while contacting the clutch hub and the sleeve, the taking-in chain conveyer being disposed along a side of the clearance measuring system;

a main chain conveyer having first and second main stoppers, the main chain conveyer being connected to a final end of the taking-in chain conveyer and disposed along a front side of the clearance measuring system;

a clamping mechanism for clamping the clutch hub and the sleeve, stopped by the second main stopper, and which takes the clutch hub and the sleeve into/out of the clearance measuring system;

a taking-out chain conveyer having a taking-out stopper pusher which, when the clutch hub and the sleeve go thorough a measuring process, transmits the clutch hub and the sleeve to the taking-out chain conveyer, the taking-out chain conveyer being connected orthogonally to a final end of the main chain conveyer; and a main controller for controlling the operation of the elements successively.

* * * * *